(12) United States Patent
Yekani

(10) Patent No.: US 6,172,144 B1
(45) Date of Patent: Jan. 9, 2001

(54) PROCESS AND COMPOSITION FOR PRODUCING ARTICLES FROM RICE HULLS

(76) Inventor: Amonollah Yekani, 1901 Amity Hill Ct., Raleigh, NC (US) 27612

( * ) Notice: Under 35 U.S.C. 154(b), the term of this patent shall be extended for 0 days.

(21) Appl. No.: 09/394,251

(22) Filed: Sep. 13, 1999

(51) Int. Cl.$^7$ .................. C08J 5/10; C08L 5/00
(52) U.S. Cl. .................. 524/27; 524/15; 524/47; 524/35
(58) Field of Search .................. 524/15, 27, 47, 524/35; 523/220

(56) References Cited

U.S. PATENT DOCUMENTS

| | | | | |
|---|---|---|---|---|
| 4,746,688 | * | 5/1988 | Bistak et al. | 523/220 |
| 4,761,451 | * | 8/1988 | Moteki et al. | 524/505 |
| 4,783,493 | * | 11/1988 | Motegi et al. | 524/13 |
| 4,882,112 | * | 11/1989 | Maki et al. | 264/109 |
| 5,002,713 | * | 3/1991 | Palardy et al. | 264/109 |
| 5,480,602 | * | 1/1996 | Nagaich | 264/122 |

* cited by examiner

*Primary Examiner*—James J. Seidleck
*Assistant Examiner*—U. K. Rajguru
(74) *Attorney, Agent, or Firm*—Mills Law Firm PLLC

(57) ABSTRACT

Hodapen pulp is a thermoplastic molding composition comprising whole or particulated rice hull pretreated with Sodium Peroxide; a resin binder as a solvent; scrap plastic; and rice hull ash as filler. The composition possesses the molding stability for a deferred use and readiness for immediate extrusion. The pulp is a new product with enhanced strength and improved water, fire, fungal, and termite resistance with superior advantage over similar products. The composition incorporates plastic waste and rice hull as its major components which by themselves contribute to environmental pollution and are treated as a disposable waste.

21 Claims, 1 Drawing Sheet

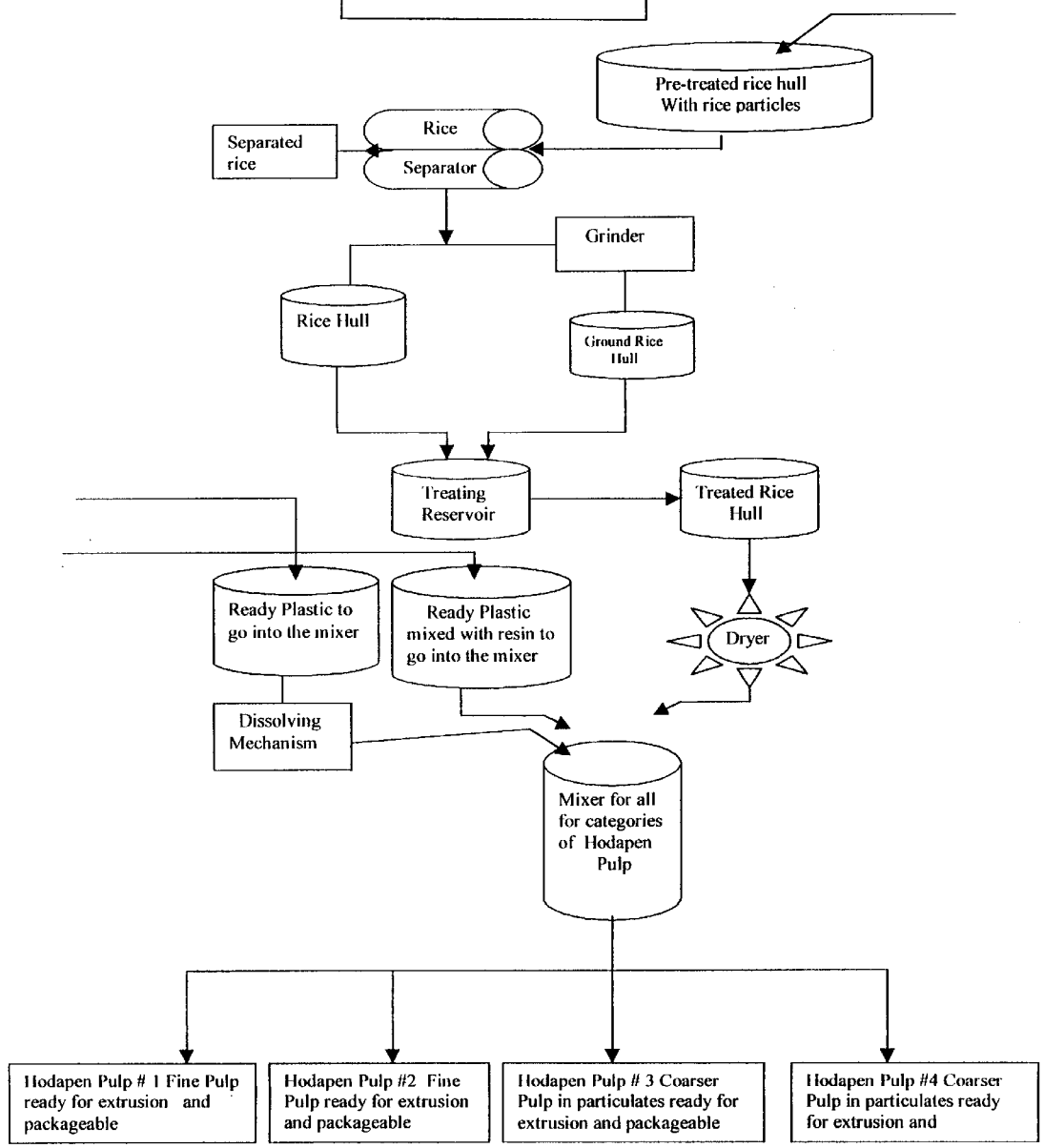

PROCESS AND COMPOSITION FOR PRODUCING ARTICLES FROM RICE HULLS

BACKGROUND OF THE INVENTION

The present invention relates to processes and compositions using rice hull in the manufacture of thermoplastic compositions for the production of articles having increased heat, water, fungal, and insect resistance. This product, the new thermoplastic composition is called "Hodapen pulp". However, for the convenience of disclosing the material in this invention, the terms Hodapen and thermoplastics composition are used interchangeably.

Rice is one of the most abundant grains and plays an important dietary role throughout the world. According to the Food and Agricultural organization of the United States, annual rice production was estimated to be in excess of 40,000,000 metric tons. A major derivative of rice production is the rice hull. The rice hull is a fibrous, non-digestible commodity, representing about 20 percent by weight of the harvested rice paddy. Typically, the dried rice paddy yields by weight, 52% white rice, 20% hull, 15% stalk, 10% bran. Generally, about 3% is lost in conversion. Rice hull resulting from such production generates a substantial disposal problem.

Rice hull has a striated configuration. The outer surface is composed of dentate rectangular elements having high silica content covered with thick cubicle and surface hair. The inner surface is composed of elongated hypodermal fibers substantially devoid of silica. The mid-region is transitional contains little silica. Overall, the rice hull is composed of silica, carbohydrates, proteins, fats and other minor organic constituents.

Rice hull is highly abrasive, poor in nutritive value, and low in bulk density. Accordingly, a few viable economic applications for this byproduct have been developed notwithstanding a widespread environmental desire to eliminate the customary disposal through burning and landfill. Burning, in particular, presents significant problems. Rice hull does not readily combust unless burned in highly controlled equipment that allows continuous removal of ash. Such equipment is costly and not widely available to the growers throughout the world. Particularly, when burning is conducted unattended in the fields, the long lasting, inefficient combustion presents fire hazards. The burning process also generates considerable smoke and airborne pollutants. The low bulk density of rice hull makes transportation to off-site burning facilities expensive, and the low fuel value of the rice hull is not commercially attractive. The low in bulk density also makes landfill disposal expensive.

To overcome these environmental and disposal problems, substantial effort has been undertaken to find new markets for the rice hull product. However, because of the aforementioned abrasiveness of the hull, lack of nutritive value, low bulk density, utilization has been limited to low value applications, such as bedding, litter, animal roughage and absorbents. While bedding and litter once were beneficial uses for the rice hull, particularly in poultry operations, other manufacturing byproducts such as wood shavings have reduced its demand. Litter usage is also adversely affected by remaining rice residue in the hull and its particulate aspiration and attractiveness to organisms, parasites, fungi, and the like. Numerous efforts have been made to use rice hull as feed for economic animals. Limited success has been achieved in this area due to the low digestibility and low nutritive value of the bull.

Efforts have also been made to utilize rice hull in other areas of the industry. For instance, the hull has been used as oil absorbent and its ash has been used in the cement industry, but there has been limited success due to its cost effectiveness applications.

As a result, a need has continued to exist for value added environmentally acceptable uses of rice hull in foregoing the customary burning and landfill disposal alternatives.

Finally, the present invention not only has overcome the inherent difficulties of utilizing rice hull for applications beyond the low value approaches, it has also incorporated plastic wastes and scraps, an environmental problem, into a composition to produce articles with excellent strength, properties, and final finish.

Due to lignocellulosic content of rice bull, it has lead to it being capable of being lumped with other like materials including grains, fibers, wood flakes and other similar cellulosic byproducts for possible combinations with other recycled materials for variety of applications. For instance, Nagich U.S. Pat. No. 5,480,602 suggests that rice hull together with plastics be used for extrusion of particleboard. Bistak et al. U.S. Pat. No. 4,747,688 suggests the use of rice hull as a cellulosic particulate component with plastic scrap to make thermoplastic molding compositions.

Montegi et al. U.S. Pat. No. 4,783,493 suggest the use of rice hull blended with thermoplastic resins for molding compositions. Moteki et al. U.S. Pat. No. 4,761,451 suggest rice hull as filler for the manufacture of acoustics vibration sheet. Parade et al. U.S. Pat. No. 5,002,713 and Maki et al. U.S. Pat. No. 4,882,112 suggests the use of rice hull in a moldable thermoplastic resin for use as flake board of particleboard panels and other shaped articles.

In the foregoing proposals, prime focus has been on cellulosic materials other than rice hull, notwithstanding peripheral mention of the possible use, few specific disclosures have been made for rice hulls usage in view of its many adverse properties that detract from its ability to simply replace other lignocellulosic materials. On the other hand, this invention exclusively deals with rice hull and not any other lignocellulosic materials. Moreover, although particleboard could be numerated as one of Hodapen's final products, the object of the invention is not to produce particleboard. In this invention the rice hull must undergo a chemical treatment process to adapt to the composition.

SUMMARY OF THE INVENTION

The present invention overcomes the inherent difficulties in utilizing rice hull for applications beyond the low value approaches. One of the foremost problems, are the hull constituencies. The various chemically differing layers of rice hull makes its incorporation into articles difficult. Used as whole or partially particulated, the rice hull does not readily bind or mix with other materials. Even ground rice hull shows little affinity for incorporation into compositions suitable for forming through extrusion or molding.

The present invention overcomes these deficiencies by providing for the pretreating of the rice hull prior to incorporation into a thermoplastic molding composition, Hodapen, which in addition to the beneficial use of normally burned or buried rice hull may also utilize waste or recycled plastic scrap.

The resulting composition may be extruded, design or bulk molded into a variety of articles having improved abrasion, temperature, moisture, rot, and insect resistance. Moreover, such articles have excellent strength and surface finish properties.

An object of the present invention is to provide a thermoplastic molding composition based on pretreated rice hull with desirable strength, resistance and properties.

Another object of the invention is to provide a process for using rice hull in making products by reducing burning and landfill disposals.

a further object of the present invention is to provide a process by which rice hull is pretreated to permit incorporation with waste and recycled plastic scrap to form a moldable composition.

Moreover, yet another object of the present invention is to use the inherent properties of rice hull to provide articles having improved water, fire, and fungal resistance.

The above and other objectives and advantages of the present invention will become apparent upon reading the following description of the preferred embodiments taken in conjunction with the accompanying drawing.

BRIEF DESCRIPTION OF DRAWING

FIG. 1 is a schematic illustrating the process of conversion of rice hull into finished article.

DETAILED DESCRIPTION OF INVENTION

The present invention provides a thermoplastic molding composition comprising: rice hull particulates pre-treated with an effective amount of Sodium Peroxide in the amount of 12 to 18% by weight; a thermoplastic resin in the amount of 3 to 7% by weight; a thermoplastic material in the amount of 25 to 40% by weight.

The thermoplastic molding composition is formed by comprising the steps of: using whole or ground rice hull of desired particulates; admixing said rice hull particulates with Sodium Peroxide; washing said rice hull particulates to remove said Sodium Peroxide to a predetermined level and provide pretreated rice hull particulates containing Sodium Peroxide; drying said pretreated rice hull particulates; and mixing said pretreated rice hull particulates with a thermoplastic resin and a thermoplastic material to form a homogeneous mixture.

More particularly, rice bull obtained as a waste produce from processing operations is initially roughly ground. Typically, the rice hull has a 2 to 5% rice flour residue that can be obtained and marketed from this step in the conversion. The rice hull is then finely ground into particulates or powder of a size suitable for the intended application, typically 25 mesh or less. The powder is then transferred to a holding reservoir and mixed with a treating agent such as Sodium Peroxide in the amount of 12 to 18% by weight of rice hull. The mixture is then held for a period of at least 48 hours. without such treatment, the experiment has shown that the rice hull would not readily mix with the binder and the added solvent or scrap plastic.

Suitable resins include ethylene, propylene, and the like including mixtures, copolymers, and monomers copolymerizable therewith. Typical plastic used in the present process includes polyethylene, polypropylene, acrylics, polystyrenes, polycarbonates, phenloics, polyesters and the like. The plastics are preferably plastic scraps or waste products, however new material may be used. Waste or scrap plastics are suitably preprocessed for incorporation into the mixer. Up to about 40 percent plastic may be used in the composition with resin in the amount of 2 to 5% by weight of the plastic. Additives and fillers, preferably rice hull ash may be added depending on the end use of the composition. The mixture is then mixed, blended or tumbled to produce a homogeneous mixture.

The resultant composition may be bulk packaged or extruded depending on what method of pulp production is being applied. The composition may be shaped by conventional techniques into a variety of articles having enhanced strength and environmentally improved properties such as water, fire, fungal, and termite resistance.

Moreover, Sodium Peroxide reacts with the minimal remaining rice flower and generates a lubricity in the treated hull, which is beneficial in the relocation and extrusion process of the mixture. After the holding period, the mixture is washed for removal of Sodium Peroxide. While most of the Sodium Peroxide is removed through washing process, about 1 to 7% will remain in the final hull before it is introduced into the next step, the drying process. The washed substance is then transferred to a drying apparatus for drying.

The production of Hodapen pulp depending on the type of hull particulates, fine or coarse and the temperature setting of the manufacturing environment is categorized as follows:

1. Pulp with fine hull particulates at cold operation environment
2. Pulp with fine hull particulates at hot operation environment
3. Pulp with coarse hull particulates at cold operation environment
4. Pulp with coarse hull particulates at hot operation environment All four categories include a common preparation process comprising the steps of: grinding, treating, and a drying process. At first the rice hull is ground to desired particulate size, then it is led into a treating container in which it is sprinkled with Sodium Peroxide. Later the treated material is left to rest for about 48 hours. Then it is washed with water and led into a drying apparatus. The drying process does not remove the entire Sodium Peroxide and water content of the treated material. After drying the hull is led into a mixer. Other compositions are added to the mixer. The mixture is then blended, mixed, and tumbled for a homogeneous mixture.

The pulps produced in cold environment settings do have the packaging and extrusion capability for desired final article. The pulps produced in the hot environment setting could only be extruded for final products. The composition may be shaped by conventional techniques into a variety of articles having enhanced strength and environmental resistance properties.

The compositions according to the present invention may be formulated according to known techniques in the art for filled thermoplastic compositions. After charging into a suitable apparatus such as a Prodex or Henschel mixer, ribbon blender or tumbler, the components are mixed to form a substantially homogeneous mixture. While the components need not necessarily be added in any particular order, it is preferred to initially add the resin to the treated rice hull mixing until incorporated, thereafter, adding the plastic scrap followed by the filler and additives.

The resulting composition may be extruded into panels or bulk packaged for conventional moldings into the final articles. The thermoplastic molding composition may also be formed under higher temperature conditions wherein the plastic material is initially melted and added to the pretreated rice hull particulates without the resin. In such a process the resultant composition is thoroughly mixed and directly extruded into a mold die, press or like apparatus.

Such a thermoplastic composition does not have any packaging capability for deferred use.

The resultant composition may be used for a variety of extruded, design or bulk molded into: furniture articles, indoor and outdoor articles; construction products, and automobile products. In the furniture industry, the composition may be used for making chairs, tables, desks, shelves, and like articles benefiting from the water, fire, pest and fungal resistance properties. The same may also be used for decorative furniture such as statues, picture frames, pianos and like products.

In the construction industry, the composition may be used for sidings, interior Moldings, millwork and trims. Additionally, countertops, file cabinets, bookshelves, stairways and moldings. Moreover, molded panels may be used in the structure of mobile homes and other modular construction. The aforementioned properties may also be realized as forms and like barriers in construction.

In the automotive industry, the composition may be used in substitution for fiberglass, both exterior and interior, as well as dashboard components and interior trim. The water resistance may also be employed in marine applications including boats and canoes. park and recreational centers can use the material for benches, shelters and structures requiring water and rain resistance as well as environmental and pest resistance.

Such articles may be handles, worked and joined in the manner as like materials through nailing, mechanical fastening, gluing, cutting, and contour forming.

The present invention provides a moldable and extrudable thermoplastic composition consisting of a mixture of rice hull in the form of finely ground rice hull pretreated with, waste or scrap plastic, a polymer resin, a rice hull as a filler.

The rice hull, a waste product of rice harvesting, may be obtained from substantially all varieties of rice harvested for consumption throughout the world. Such rice hull is readily available inasmuch as the current primary utilization is disposal through burning or landfill.

The plastic material used herein is preferably waste or scrap material. While the former is preferred for environmental and economic considerations, new materials may be used. Typical plastics useable herein include polypropylene, polyethylene, polystyrene, polyesters, polycarbonates, phenolics, or other extrudable plastics.

The binder resin used herein is preferably selected from the polylefins described Above.

The preferred filler used herein is rice hull ash, which may be readily obtained through controlled combustion of the rice hull.

Further additives may be utilized for desired properties. Examples of such additives include antioxidants, heat stabilizer, UV absorbers, anti-static agents, lubricants, plasticizers, pigments, dispersing agents, lubricants and the like.

It will thus be apparent that the present invention provides unique advantages in utilizing waste rice hull as a key component in achieving the foregoing water, fire and pest resistance properties while providing outstanding strength and surface finish. The compositions effectively and beneficially utilized, for economically valuable application, waste materials normally discarded in environmentally counter productive ways.

Many modifications of the present invention will become apparent to those skilled in the art in view of the foregoing description. Accordingly, it is intended that all such modifications, which fall within the true scope of this invention, be included within the scope of the appended claims.

What is claimed is:

1. A thermoplastic molding composition comprising:

rice hull material pretreated with sodium peroxide and with an effective amount of thermoplastic resin and thermoplastic material.

2. A thermoplastic molding composition as recited in claim 1 wherein said rice hull material contains residue of sodium peroxide in the amount of 1 to 7 percent by weight.

3. A thermoplastic molding composition as recited in claim 2 wherein said thermoplastic resin is selected from the group consisting of polyols, polyesters, and phenolics.

4. The thermoplastic molding composition as recited in claim 2 wherein said thermoplastic resin is present in the amount of about 5 to 7 percent by weight.

5. The thermoplastic molding composition as recited in claim 1 wherein said thermoplastic material is selected from the group consisting of recycled plastic scrap and waste plastic scrap.

6. The thermoplastic molding composition as recited in claim 5 wherein said thermoplastic material is selected from the group consisting of polyethylene, polyester, and polypropylene.

7. The thermoplastic molding composition as recited in claim 6 wherein said thermoplastic material is present in the amount of 20 to 40 percent by weight.

8. The thermoplastic molding composition as recited in claim 1 including rice hull ash as filler.

9. The thermoplastic molding composition as recited in claim 8 wherein said rice hull ash is present in an amount of 2 to 5 percent.

10. The thermoplastic molding composition as recited in claim 1 wherein said rice hull material is selected from the group consisting of whole rice hulls and rice hull particulates.

11. A thermoplastic molding composition with enhanced strength and improved environmental properties such as water, fire, fungal and termite resistance comprising: rice hull particulates pretreated with an effective amount of sodium peroxide in the amount of 1 to 7 percent by weight; a thermoplastic resin in the amount of about 5 to 7 percent by weight; plastic material in the amount of 20 to 40 percent by weight; and rice hull ash in the amount of 0.5 to 2.5 percent by weight.

12. A method of making a thermoplastic molding composition, comprising the steps of:

a. grinding rice hulls to a predetermined particle size to form rice hull powder;

b. admixing said rice hull powder with sodium peroxide;

c. washing said rice hull powder to remove said sodium peroxide to a predetermined level to provide a pretreated rice hull powder containing sodium peroxide;

d. drying said pretreated rice hull powder; and e. mixing said pretreated rice hull powder with a thermoplastic resin and thermoplastic material to form a homogeneous mixture.

13. The method as recited in claim 12 wherein said pretreated rice hull powder contains a residue of sodium peroxide in the amount of about 1 to 7 percent by weight.

14. The method as recited in claim 12 wherein said thermoplastic resin is selected from the group consisting of polyols, polyesters, and phenolics.

15. The method as recited in claim 12 wherein said thermoplastic resin is present in said homogeneous mixture in the amount of about 5 to 7 percent by weight.

16. The method as recited in claim 12 wherein said thermoplastic material is selected from the group consisting of polypropylene and polyesters.

17. The method as recited in claim 16 wherein said thermoplastic material is selected from the group consisting of plastic scrap and recycled plastics.

18. The method as recited in claim 17 wherein said thermoplastic material is present in said homogeneous mixture in the amount of about 20 to 40 percent by weight.

19. The method as recited in claim 12 including the step of adding rice hull ash to said homogeneous mixture as a filler.

20. The method as recited in claim 19 wherein said rice hull ash is present in the amount of about 0.5 to 2.5 percent by weight.

21. The method as recited in claim 12 including the step of molding an article from said homogeneous mixture.

* * * * *